US012681035B2

(12) United States Patent
Rider et al.

(10) Patent No.: US 12,681,035 B2
(45) Date of Patent: Jul. 14, 2026

(54) FLUID FLOW ESTIMATION AND NAVIGATION

(71) Applicant: FLARE BRIGHT LIMITED, Westcott (GB)

(72) Inventors: Conrad Rider, Westcott (GB); Carl Sequeira, Westcott (GB); Gabriel Furse, Westcott (GB)

(73) Assignee: FLARE BRIGHT LIMITED, Westcott (GB)

( * ) Notice: Subject to any disclaimer, the term of this patent is extended or adjusted under 35 U.S.C. 154(b) by 244 days.

(21) Appl. No.: 18/237,353

(22) Filed: Aug. 23, 2023

(65) Prior Publication Data

US 2024/0069058 A1 Feb. 29, 2024

(30) Foreign Application Priority Data

Aug. 25, 2022 (GB) ...................................... 2212389

(51) Int. Cl.
*G01P 5/02* (2006.01)

(52) U.S. Cl.
CPC ...................................... *G01P 5/02* (2013.01)

(58) Field of Classification Search
CPC ........................................................ G01P 5/02
See application file for complete search history.

(56) References Cited

U.S. PATENT DOCUMENTS 10,125,841 B2 * 11/2018 Coombs ................ F16F 9/5165
2009/0028440 A1 * 1/2009 Elangovan ............. H04N 5/272
382/103

2011/0231116 A1 * 9/2011 Linn ........................ G01M 9/08
702/50
2014/0129057 A1 * 5/2014 Hall ........................... G01P 5/02
701/7
2021/0107633 A1 * 4/2021 Kimchi .................... B64C 25/52
2021/0125515 A1 * 4/2021 Mikic ..................... G09B 9/206
2021/0396778 A1 * 12/2021 Pearson .................. G01P 1/026

OTHER PUBLICATIONS

Extended European Search Report for EPO App. 23192135.4 dated Jan. 22, 2024 (11 pages).

(Continued)

*Primary Examiner* — Seth A Silverman

(74) *Attorney, Agent, or Firm* — Foley & Lardner LLP

(57) ABSTRACT

The present invention is directed to methods, systems, and computer program products for determining a fluid flow estimate vector based on sensor measurements, from one or more inertial sensors, wherein the sensor measurements are indicative of a force on a vehicle. The force on the vehicle may be determined based on the received sensor measurements and a fluid flow estimate vector may be determined corresponding to the determined force based on an inverted Fluid Flow to Force mapping function, wherein the mapping function is trained based on one or more training datasets and the fluid flow estimate vector is indicative of a fluid flow affecting the vehicle. The fluid flow estimate vector may be used to increase the accuracy of inertial navigation techniques, wherein the fluid flow estimate vector may be used with an estimate of the prevailing wind to estimate a ground velocity vector from which a vehicle position estimate may be determined.

17 Claims, 3 Drawing Sheets

(56)     References Cited

OTHER PUBLICATIONS

Tomic Teodor et al: "The flying anemometer: Unified estimation of wind velocity from aerodynamic power and wrenches", 2016 IEEE/ RSJ International Conference on Intelligent Robots and Systems (IROS), IEEE, Oct. 9, 2016, pp. 1637-1644, XP033011614, DOI: 10.1109/IROS.2016.7759264 [retrieved on Nov. 28, 2016].

* cited by examiner

FLUID FLOW ESTIMATION AND NAVIGATION

CROSS-REFERENCE TO RELATED APPLICATIONS

The present application claims priority from GB Patent Application No. 2212389.7 filed Aug. 25, 2022, which is incorporated herein by reference in its entirety for any and all purposes.

FIELD

The present invention relates to fluid flow estimation and, in particular, fluid flow estimation around and/or over a body of a vehicle in motion and its use as a means of aiding navigation for a moving vehicle.

BACKGROUND

Traditional sensors for measuring the flow around and/or over a body of a vehicle, for example, aircraft such as drones or aeroplanes, and underwater craft such as submersibles, have several disadvantages. For example, traditional sensors for measuring flow, usually based on the concept of a pitot tube, are typically too large and heavy for the payload capacity of small drones and nano-drones or are faced with serious technical challenges, for example, on larger aircraft systems, such as aeroplanes, the traditional flow sensors face issues regarding reliability, such as sensitivity to the operating environment (for example sand/icing conditions), sensitivity to airframe position, sensor noise, and a low sampling frequency.

Accordingly, the present invention seeks to address, at least in part, any or all of the drawbacks and disadvantages described above.

SUMMARY

According to a first aspect of the present invention there is provided a method comprising: receiving one or more sensor measurements from one or more inertial sensors, wherein the sensor measurements are indicative of at least one acceleration of a vehicle; determining a force on the vehicle based on the received sensor measurements indicative of at least one acceleration; and determining a fluid flow estimate vector corresponding to the determined force based on an inverted Fluid Flow to Force mapping function, wherein the mapping function is trained based on one or more training datasets and the fluid flow estimate vector is indicative of a fluid flow affecting the vehicle.

In some embodiments, the inverted Fluid Flow to Force mapping function may be represented by a Force-Flow look-up table and determining the fluid flow estimate vector may further comprise referencing the Force-Flow look-up table based on the determined force to determine the corresponding fluid flow estimate vector.

In some embodiments, determining the fluid flow may further comprise interpolating the determined force to a corresponding fluid flow estimate vector.

In some embodiments, the method may further comprise: determining a force delta, wherein the force delta may be a difference between a force with a change in a control surface state and a force without the change in the control surface state; and adding the force delta to the determined force.

In some embodiments, determining the force delta may comprise: identifying an initial fluid flow estimate vector;

receiving data relating to a current control surface state; and referencing a Force Delta look-up table based on the initial fluid flow estimate vector and the data relating to the current control surface state.

In some embodiments, the method may further comprise: performing a plurality of simulations on a dynamic model of the vehicle, wherein the simulations may determine a force with a change in a control surface state and a force without the change in the control surface state, for a given fluid flow; determining a difference between the force with the change in a control surface state and the force without the change in the control surface state; and populating the Force-Delta look-up table with the determined difference.

In some embodiments, the method may further comprise modifying the sensor measurements to remove an effect of at least one external force.

In some embodiments, the method may further comprise: performing a plurality of simulations on a dynamic model of the vehicle, wherein the simulations may determine a force for a given fluid flow; and populating the Force-Flow look-up table with the determined simulated force. In other words, the plurality of simulations may provide one or more datasets and the one or more datasets may be used to train, e.g. populate, the mapping function, e.g. the Force-Flow look-up table.

In some embodiments, the method may further comprise: receiving telemetry data from a plurality of vehicle operations and/or data from wind tunnel experiments; and populating the Force-Flow look-up table based on the received data. In other words, the data may provide one or more datasets and the one or more datasets may be used to train, e.g. populate, the mapping function, e.g. the Force-Flow look-up table.

In some embodiments, the Force-Flow look-up table may comprise a plurality of force buckets, wherein populating the Force-Flow look-up table with the determined simulated force may further comprise assigning each determined simulated force to one or more proximate force buckets proportional to a distance between the determined simulated force and the one or more proximate force buckets.

In some embodiments, each force bucket may be indicative of an average, or weighted average, fluid flow corresponding to the forces assigned to each force bucket.

In some embodiments, each force bucket may be indicative of a region of fluid flows corresponding to the forces assigned to each bucket.

In some embodiments, the method may further comprise applying a variable resolution to each of the force buckets.

In some embodiments, the method may further comprise restricting the fluid flow function to a predefined set of fluid flows.

In some embodiments, the method may further comprise: receiving a ground velocity estimate of the vehicle; and determining a wind estimate based on the fluid flow estimate vector and the ground velocity estimate.

In some embodiments, the method may further comprise determining a ground velocity estimate based on an estimate of a prevailing wind and the fluid flow estimate vector.

In some embodiments, the method may further comprise: performing flow based navigation by determining a vehicle position estimate based on an integration of the determined ground velocity estimate from a prevailing wind estimate and the fluid flow estimate vector.

According to a second aspect of the present invention there is provided a computer program product comprising computer readable executable code for implementing one or more of the features of the method of the first aspect.

According to a third aspect of the present invention there is provided a system comprising: a computing device; and a vehicle; wherein the system is configured to implement one or more of the features of the method of the first aspect.

In some embodiments, the computing device may include one or more of a processor, a computer, a laptop, a tablet, a smartphone or any other suitable computing device.

In some embodiments, the vehicle may be an aerial vehicle or a submersible vehicle.

It will be appreciated that any features described herein as being suitable for incorporation into one or more aspects or embodiments of the present invention are intended to be generalizable across any and all aspects and embodiments of the present invention. Other aspects of the present invention can be understood by those skilled in the art in light of the description, the claims, and the drawings of the present application. The foregoing general description and the following detailed description are exemplary and explanatory only and are not restrictive of the claims.

BRIEF DESCRIPTION DRAWINGS

Embodiments will now be described, by way of example only, and with reference to the accompanying drawings, in which.

DETAILED DESCRIPTION

Figure 1:
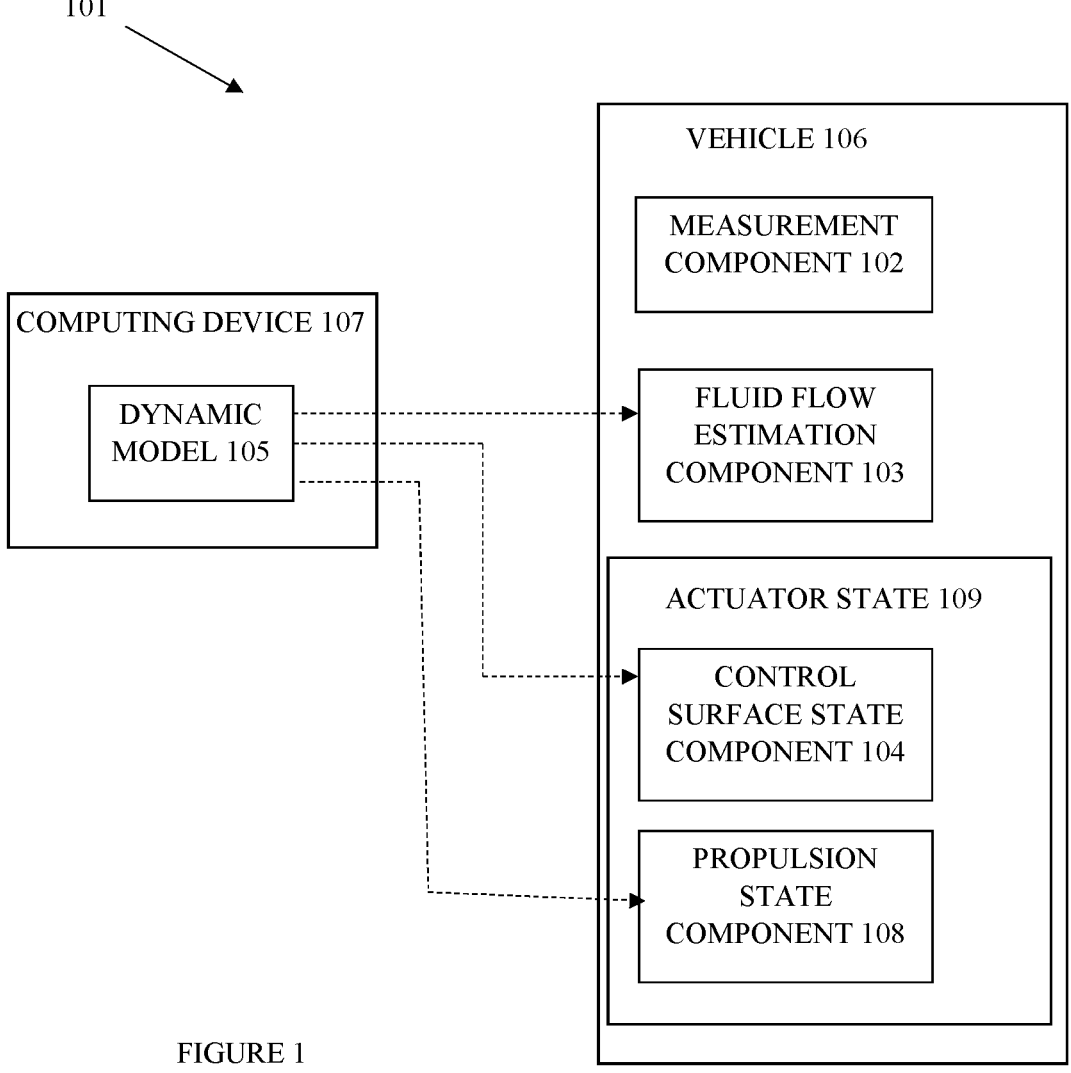
FIG. 1 shows a schematic of a system according to one or more embodiments of the present invention.

The present invention relates to fluid flow estimation (e.g. airflow estimation or water flow estimation) around the body of a vehicle during operation by utilising inertial sensors, such as accelerometer sensors, gyroscopes, magnetometers, and so on, located on or within the body of the vehicle, wherein the inertial sensors provide one or more sensor measurements indicative of at least one acceleration of the vehicle, along with an aerodynamics model of the vehicle which may be calibrated using operational data and machine learning.

The vehicle may be an aerial craft, such as an aerial drone or aircraft, or an underwater vehicle, such as a submersible. For such vehicles, it is important to be able to determine or estimate the fluid flow conditions around and affecting the vehicle, especially for autonomous vehicles where the vehicle that is configured to dynamically adjust, re-orientate or adapt its own course or path for at least a portion of a manoeuver, i.e. an aerial flight or an underwater voyage, without any control input from an operator or user.

The present invention utilises the inertial sensors located on the vehicle body to estimate fluid flow conditions of the vehicle body in operation by essentially relating one or more determined forces, wherein the one or more determined forces are determined based on at least one acceleration measurement provided by the one or more inertial sensors, e.g. accelerometers, in operation to data from an inverted vehicle dynamics model. This enables the fluid flow conditions that substantially equate to the determined forces to be determined, or estimated. For example, for an aerial drone the fluid flow conditions, such as fluid velocity, e.g. airflow, may be estimated by a relationship from force-to-flow during operation, for example, by a mapping function trained on one or more sets of training data, using one or more robust, lightweight and small Inertial Measurement Units (IMUs) without the need for conventional pressure based flow sensors, which are typically large, heavy and have drawbacks, such as reliability, sensitivity, low sampling rates, and so on. Similarly, for underwater vehicles fluid flow conditions, such as water flow, may also be estimated by a relationship of force-to-flow. The fluid flow estimation may then advantageously be used to determine a wind estimation for an aerial vehicle or current estimation for an underwater vehicle.

Furthermore, the system may measure an unsteady, 3D, flow vector, at frequencies determined by the update frequency of the IMUs, providing a means to fully map the flow the vehicle body is passing through without the drawbacks and limitations due to vehicle frame position issues or the need for multiple sensors across the vehicle. The high frequency, unsteady, data generated from this novel fluid flow estimation system further advantageously enables the concept of 'flow based navigation' whereby a traditional inertial navigation system can be augmented by accurate information of the localised fluid flow conditions. This enables the typical 'integration' errors associated with an inertial navigation based 'dead-reckoning' system to be greatly reduced, therefore allowing GPS-free, inertial navigation to be accurately used for longer than conventionally possible based on the quality of the IMU and the accuracy of the vehicle dynamics model.

Vehicle dynamic models are traditionally utilised to estimate the forces on the vehicle body given the fluid flow conditions around and/or affecting the vehicle body. The forces acting on the vehicle can then be calculated by a function shown in equation (1).

$$\text{Fluid Flow} \rightarrow \text{Force.} \qquad \text{Equation (1)}$$

Note that, in order to consider the impact of operating conditions such as temperature, pressure and humidity, the 'fluid flow' in Equation 1 may be defined at a reference fluid density, such that it may be mathematically represented as a density multiplied by velocity. This enables the actual operating fluid flow velocity to be re-calculated at any stage of the calculation using a ratio of the reference flow density to the operating density of the fluid.

Embodiments of the present invention essentially invert this traditional relationship, shown in equation (1) using a trained mapping function, that is to utilise the determined force during operation based on measured inertial measurements indicative of at least one acceleration of the vehicle to determine, or estimate, the aerodynamic/hydrodynamic forces on the vehicle in order to then determine, or estimate, the flow conditions over or affecting the vehicle body.

In the following examples and embodiments, the fluid flow estimation is primarily described in relation to an aerial drone, such as a fixed wing drone that comprises a number of control surfaces, such as elevon control surfaces, which provide direct control over the pitch and roll of the drone during flight. The drone may be powered, e.g. comprise thrusters or other propulsion means, or unpowered, e.g. where the initial propulsion is achieved using a launching device. However, as will be appreciated, the embodiments and examples of the present invention are also equally applicable to other aerial vehicles, such as aircraft, or underwater vehicles, such as submersibles.

FIG. 1 shows an overview of the system 101 according to one or more embodiments of the present invention, wherein the system 101 may include one or more of the components described below and, as will be appreciated, any number of further components may be included in the system depending on the requirements. Furthermore, one or more components may be combined to a single component and/or be implemented by any hardware and/or software required.

In one or more embodiments, the system 101 may comprise a vehicle 106 that includes one or more of a measurement component 102, a Fluid Flow estimation component 103, an Actuator State component 109, which may include a Control Surface State component 104, and a Propulsion State component 108. The one or more components may be implemented by one or more processors/controllers operatively connected to at least one memory. A computing device 107, e.g. server, laptop, computer, tablet, etc., may comprise a Dynamic Model component 105 which prior to operation of the vehicle 106 may be operatively connected to the Fluid Flow estimation component 103, the Control Surface State component 104 and/or the Propulsion State component 108.

One or more of the components of the vehicle may be performed online, that is whilst the vehicle is in operation, whilst the component of the computing device 107 may be performed offline, which is prior to the vehicle being in operation.

The control surface state component 104 may determine the state of one or more control surfaces of the vehicle in operation as any changes to one or more control surface states can affect the forces and torque acting on the vehicle, which can be taken into account.

The propulsion state component 108 may determine the state of one or more propulsion systems of the vehicle (e.g. propellers, jets, rotors, impellers, and so on) in operation as any changes to one or more propulsion systems can affect the forces and torque acting on the vehicle, which can be taken into account.

The fluid flow estimation component 103 may be performed online using a mapping function based on one or more training datasets, such as a pre-populated look-up table, a neural network, or any other trained mapping function to relate the measurements from the inertial sensors to an estimate of the fluid flow. The mapping function may be generated and populated (i.e. trained using one or more training datasets) offline e.g. via simulations using the Dynamic Model component 105 of the computing device 107.

One method to generate and populate the mapping function, which in this example is a look-up table but would equally apply to other mapping functions, is to perform tens of thousands, if not hundreds of thousands of simulations by the dynamic model component 105, using an accurate flight dynamics model, verified using real-world flight test data, to define the force-flow relationship. An alternative, or additional, method to generate and populate the look-up table is to utilise telemetry data that has been gathered from flight test programmes (e.g. hundreds if not thousands of actual real world vehicle flights), and/or wind tunnel experiments. The telemetry data may include, or allow derivation of, flow state, acceleration state and actuator state for the vehicle for each real world flight.

Thus, it is possible to populate or generate the relationship in the force-flow mapping function, e.g. look-up table, using real test data, for example from, but not limited to, wind tunnel experiments and/or flight test programmes, and/or alternative simulation datasets, such as, but not limited to, computational fluid dynamics models, and/or a combination of different data sources, such as, but not limited to, the examples herein, in order to define the flight operating space to the level of detail required. In other words, the force-flow mapping function, e,g, the look-up table, can be trained using the one or more training datasets mentioned above, e.g. the real test data, the simulated data, and/or other suitable training datasets to train, e.g. populate, the force-flow mapping function.

The dynamic model of the vehicle may be any model that sufficiently accurately represents the vehicle. The dynamic model may be based on a panel-based dynamic model that represents the vehicles, e.g. the aerial craft or underwater craft, as a single central mass with a configurable distribution, and a user-defined collection of surfaces that capture its aerodynamic and/or hydrodynamic characteristics.

Lifting surfaces, actuators, propulsors, and gravity all contribute to applying forces and torques to the vehicle body (e.g. the single central mass in the physics model) causing it to move and rotate, which may be suitably modelled in the dynamic model for the vehicle.

The dynamic model may be configured to simulate one or more of the physical characteristics of the vehicle or environmental effects on the vehicle. The physical characteristics may include, for example, one or more of mass, dimensions, inertial characteristics, aerodynamic/hydrodynamic characteristics such as lift, drag, pitching moments, and roll moments dependent on angle of attack and Reynolds number, collisions, friction, mechatronic characteristics of the actuator subsystems, wherein the actuator subsystems may include one or more of motor characteristics and/or control surface characteristics (e.g. elevons, rudders, fins, thrusters, propellers, jets, etc.), along with any other required physical characteristic of the vehicle. The environmental effects may include, for example, one or more of gravity, air pressure, temperature, humidity, viscosity, fluid flow (including turbulence) such as wind and currents, gusts, vorticity and collisions, along with any other required environmental effects on the vehicle.

The dynamic model may also be configured to model and/or simulate each surface of the vehicle that have configurable aerodynamic/hydrodynamic properties. For example, the dynamic model may be configured to model and/or simulate, for each surface of the vehicle, one or more of area, orientation, axis of movement, centre of pressure, offset from centre of mass, degradation curves caused by downwash, or other interaction, from other surfaces, along with any other required simulations for each surface of the dynamic model of the vehicle.

The dynamic model may be further configured to utilise user specified parameters and factors, for example, user-configurable lift/drag lookup tables (which may enable the use of aerodynamic data from Computational Fluid Dynamics (CFD) or wind tunnel experiments) and/or additional linear and angular drag factors.

The dynamic model may be a bespoke physics model software and/or hardware or may utilise one or more currently available dynamic model software and/or hardware tools, such as Gazebo, XPlane, JSBSim and so on. Thus, any suitable dynamic model software and/or hardware may be used which includes configurable parameters related to various aspects of the vehicle physical models that may be configured and/or altered.

In the following examples and embodiments, the vehicle is a drone, in particular an unpowered drone, and a flight dynamic model is used which is based, at least in part, on an aerodynamic model, wherein the flight dynamic model may include or represent all of the forces acting on the drone, for example, forces from environmental effects, forces from physical characteristics, and so on. Similarly, as will be appreciated, if the vehicle was an underwater vehicle then a vehicle dynamic model is used which is based, at least in part, on a hydrodynamic model, wherein the dynamic model may include or represent all of the forces acting on the submersible, for example, forces from environmental effects, forces from physical characteristics, and so on.

The aerodynamic model relates to the forces that result from a fluid flow affecting the vehicle. The flight dynamics model relates the movement of the vehicle, e.g. how the vehicle is affected by mass/inertia and may further include the effects of one or more vehicle components such as actuator movement, propeller thrust, and so on.

In the flight dynamics model of the drone, the properties of mass and inertia tensor are predetermined and set based on the real drone being simulated, in other words, the properties of mass and inertia tensor are based on measurements of the actual drone being simulated in order to construct an accurate three dimensional mass model of the drone.

In order to facilitate the simulation of the aerodynamics of one or more wing parts, which may also move with control input, e.g. elevons, the aerodynamic model enables any number of massless surfaces to be defined. Each of the one or more wing parts may include one or more of:

Centre of pressure (relative to centre of mass of the vehicle);

Normal (the orientation of the lifting surface relative to the vehicle);

Surface area (m2);

Drag/lift coefficients by angle of attack;

Angular Drag coefficients; and

Flow degradation performance characteristics due to upwind surfaces.

The state of the drone may be represented in the dynamic model by one or more of:

Position in 3-dimensions in the Earth frame;

Velocity in 3-dimensions in the Earth frame;

Acceleration in 3-dimensions in the Earth Frame;

Attitude as a quaternion;

Angular velocity as a 3 axis angular velocity vector;

Angular acceleration as a 3 axis angular acceleration vector;

Control surface state, e.g. elevon positions; and

Propulsor state, e.g thruster output.

The Earth frame may be defined by one of several conventional notations and, in this example, the Earth frame is defined by the North-East-Down (NED) frame. Using the NED frame notation, the frame is typically fixed to the vehicle and moves with the vehicle body. The NED frame is typically defined such that the North and East axes form a plane tangent to the Earth's surface at its present position and the Down axis points towards the centre of the Earth. The angular components of angular velocity and angular acceleration may be represented by a respective 3 axis vector and the angular position/attitude may be represented by Rotation objects which can be defined in terms of euler angles, but are backed by a quaternion representation to avoid gimbal lock complications.

The simulations performed using the above described example dynamic model may be executed as event-based simulations based on an event-based architecture, as this has several advantages. For example, an event-based architecture allows the simulation time to be effectively decoupled from actual time such that the simulations can be executed as event-based simulations and therefore based on events rather than based on time. The event-based architecture further enables the execution of simulations at any speed from slow motion to allow observation of highly dynamic behaviours, for example, launch or chaotic motion behaviour, real-time to allow observation of the simulation, through to essentially instantaneous for data gathering and for rapid population of the look-up table.

Furthermore, as the simulations may be based on an event-based architecture then if the simulations are executed essentially instantaneously the simulations may be significantly faster than real-time on a typical conventional desktop computer (for example, on a desktop computer with a quad-core 2.7 GHz processor a factor of approximately 100× speed up can be achieved). This is advantageous as an operation (e.g. a flight or an underwater voyage) of 10 minutes in the real-world can be simulated in approximately 6 seconds, where the duration of the simulation is only limited by the computer processor capability.

However, as will be appreciated, the simulations may alternatively be based on a clock-based architecture such that the simulations are executed in real-time.

The simulation may work in discrete time steps for a given frequency. On each simulation iteration, forces and torques acting on the vehicle are calculated, based on one or more of the following simulated factors:

Force of gravity;

Lift and drag force/torque (for each 'surface', acting at centre of pressure points);

Launch and thrust forces/torques (acting on centre of mass);

Forces/torques caused by one or more propulsion systems; and

Forces/torque caused by wind (acting on each surface).

The vehicle state is then updated for the current time step, according to the resultant force and torque and the physics equations (2) to (11), described below.

During each simulation, the dynamic model component utilises one or more physics equations in order to calculate the resultant forces and torques acting on the drone for a given simulated fluid flow conditions. The Force-Flow mapping function, e.g. a look-up table can then be populated or generated, e.g. trained, based on a dataset of the calculated resultant forces for the simulated fluid flow conditions, as will be described in more detail further below.

In the dynamic model, gravity g may be assumed to be constant.

The dynamic model may, during each simulation, calculate lift L and drag D forces using:

$$L = Cl \cdot \frac{\rho V^2}{2} \cdot A; \qquad \text{-Equation (2)}$$

$$D = Cd \cdot \frac{\rho V^2}{2} \cdot A; \qquad \text{-Equation (3)}$$

where:

L is lift force in Newtons;

D is drag force in Newtons;

$\rho$ is the air density in kilograms per metre cubed. Assumed to be sea-level density at 20° C. which is 1.2 kg/m$^3$;

A is the wing area in metres squared;

Cl is the dimensionless coefficient of lift, determined experimentally at a range of angles of attack; and Cd is the dimensionless coefficient of drag, determined experimentally at a range of angles of attack.

While forces of gravity can be assumed to act on the centre of mass and therefore not resulting in rotation moments, the forces of lift and drag will be assumed to act on the centre of pressure of the lifting surface in the dynamic model. The dynamic model may then also calculate the resulting torque acting on the rigid body of the drone, which may be calculated using T=Fr·sin($\theta_F$)—Equation (4).

The inertia tensor may be derived from a CAD model of the vehicle, or through theoretical approximations, or any other method, and specified in the dynamic model.

Based on the calculated torque and inertia tensor, the dynamic model may also calculate an angular acceleration $\alpha$ using $\alpha = I^{-1}*T$—Equation (5) where Equation (5) is understood as a matrix equation.

An angular velocity $\omega$ may also be calculated by the dynamic model based on the angular acceleration using $\omega = \alpha t$—Equation (6).

Based on the angular velocity and the angular acceleration, the dynamic model may also calculate an angular displacement $\theta$ using $$\theta = \omega t + \frac{1}{2}\alpha t^2; \qquad \text{—Equation (7)}$$

where:

T is the torque force in Newtons;

I is the moment of inertia in kilogram metres squared;

m is the vehicle mass in kilograms;

r is the distance in metres of the centre of pressure from centre of mass in metres;

F is a force vector acting on the vehicle in Newtons;

$\theta_F$ is the angle the force vector acts at in radians;

$\alpha$ is the angular acceleration in radians per second squared;

$\omega$ is the angular velocity in radians per second;

$\theta$ is the angular displacement in radians; and t is the time passed in seconds.

Thrust for the simulated vehicle may be calculated by the dynamic model at each time step, based on the instantaneous thrust control input, and can be estimated for either or both of static and dynamic thrust, calibrated from real test data.

The dynamic model component may, during each simulation, also calculate:

acceleration from force using a=F/m—Equation (8);

velocity from acceleration using v=at—Equation (9); and displacement from acceleration and velocity using $$d = vt + \frac{1}{2}at^2 \qquad \text{—Equation (10)}$$

where:

d is displacement in metres;

v is velocity in metres per second;

a is acceleration in metres per second squared;

t is the amount of time that has passed in seconds;

F is force acting on the body in newtons; and m is the mass of the body in kilograms.

The dynamic model described above is one suitable example for calculating the various forces and torques of a given real world drone during the execution of a number of simulations of operational flights, where other dynamic models may alternatively be used for the same purpose. Other dynamic models may include simulation of non-constant (linear and angular) acceleration. The dynamic model enables the forces that would be experienced by the drone during an actual flight to be related to the airflow (i.e. fluid flow) conditions that give rise to those calculated forces, based on the simulations. This information can be used to train a mapping function between force and flow, for example, stored in a look-up table such that during a real-world flight the airflow conditions can be estimated based on the measured acceleration from inertial sensors and the subsequently determined forces affecting the drone at any given time.

The simulated data, e.g. training datasets, that is utilised to populate or generate the mapping function, e.g. look-up table, relating to a relationship between fluid flow and the corresponding determined forces based on the one or more acceleration values that the vehicle will measure during operation provides the inverted vehicle dynamics model, which will enable the fluid flow conditions that substantially equate to the determined forces to be determined, or estimated, during operation of the vehicle. The generation and population of the mapping function, e.g. look-up table, in this example is trained based on a plurality of simulations and the resulting simulated training datasets (typically tens of thousands or hundreds of thousands of simulations) that are executed on the dynamics model, as will now be described.

The Force-Flow mapping function, e.g. lookup table, aims to invert the traditional function of Fluid Flow to Force in order to determine or estimate a fluid flow for a given force input. However, one problem with inverting the traditional Fluid Flow to Force function is that the function does not provide a one to one mapping between fluid flow and force as different fluid flows and flow angle combinations can induce the same force on the vehicle. In other words, the mapping of force to fluid flow is often one to many. The effects of the one to many mapping may be reduced by restricting the domain of the function of fluid flow to force when populating the look-up table. For example, in terms of a drone the function may be restricted to a predefined set of fluid flows, such as fluid flows that are within an operational envelope of the vehicle. In other words, fluid flows that are expected during a typical flight operation. Therefore, the Fluid Flow to Force function may be restricted, for example, to a predefined set of fluid flows with an angle of attack of less than 45°. As will be appreciated, the Fluid Flow to Force function may be restricted to any predefined set of fluid flows based on any parameters or conditions that the vehicle (e.g. aerial craft or underwater craft) may typically be expected during operation of the vehicle.

In the example of the mapping function being a Force-Flow look-up table, the look-up table may be initialised with force 'buckets' at fixed intervals, for example, the force buckets may start at 1N and the fixed intervals may be 1N, e.g. the second force bucket would be 2N, the third force bucket would be 3N, and so on. Furthermore, as the forces acting on the vehicle will be 3-dimensional in nature then the force buckets may also be 3-dimensional in order to more accurately represent the 3-dimensional nature of the forces acting on the vehicle.

A plurality of simulations may then be executed on the dynamic model that covers all, or substantially all, fluid flows within the predefined set of fluid flows and the dynamic model effectively converts each fluid flow to a corresponding force, in other words, the dynamic model determines the corresponding force for each simulated fluid flow in the predefined set.

For each determined corresponding force for a simulated fluid flow, it is allocated to a force bucket of the Force-Flow look-up table. Each force bucket may include a floating-point count value to track the count of determined forces for a simulated fluid flow allocated to the bucket. The floating-point count value may be utilised in the generation of the look-up table but may not be taken into account during operation of the vehicle to determine, or estimate, the fluid flow at, or around, the vehicle.

Each force bucket may further include an 'average' fluid flow value of the fluid flow that each given force bucket represents, which enables each bucket to maintain an 'average' fluid flow corresponding to the force represented by the bucket. Each force bucket is therefore indicative of a representation of the fluid flows blended into a given force bucket. Each force bucket may be indicative of an average fluid flow and/or indicative of a region of fluid flows. This could be an average fluid flow value, a weighted average, a line of best fit, or any other model or complex model that is suitable for representing fluid flows, or a region of fluid flows, in each given force bucket. In the present example, a weighted average of the fluid flows that are proximate to a force bucket is used to maintain the average fluid flow corresponding to the force represented by the bucket. This arrangement also enables determined forces for simulated fluid flows to be merged in proportion to their proximity to the bucket, in other words, based on the distance between the incoming force of a simulated fluid flow and the force represented by the proximate bucket(s). The average fluid flow value for each bucket may subsequently be utilised in the determination, or estimation, of the fluid flow during the operation of the vehicle.

If the determined force for a simulated fluid flow matches a force bucket in the Force-Flow look-up table then it is allocated to that force bucket, the floating-point count value for that bucket is incremented by 1 and the average fluid flow value is likely to change very little.

If the determined force for a simulated fluid flow falls between two or more buckets, then both the floating-point count value and the average fluid flow value are updated in proportion to the proximity of the determined force and the two or more force buckets.

Figure 2:
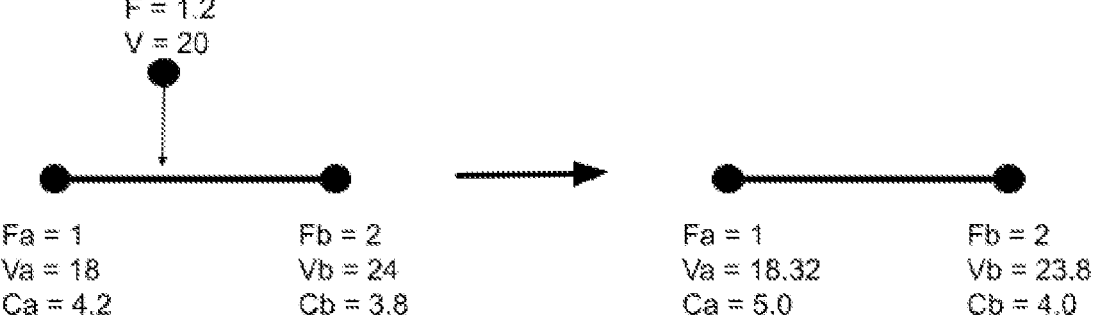
FIG. 2 shows a one-dimensional force bucket calculation according to one or more embodiments of the present invention.

A representation of this is shown in FIG. 2 in one dimension. In FIG. 2, two force buckets are shown, being Fa and Fb. Fa represents a force of 1N and Fb represents a force of 2N. At a given time in the simulations, Fa has an average fluid flow value Va of 18 and a floating-point count value Ca of 4.2, whilst Fb has an average fluid flow value Vb of 24 and a floating-point count value Cb of 3.8. During a simulation, the dynamic model determines a force value F of 1.2N for a fluid flow V of 20, which is then to be allocated to the force buckets of the look-up table. The simulated force F of 1.2N, resulting from a fluid flow V of 20, falls between the two buckets Fa and Fb, where the simulated force F is 0.2N from Fa and 0.8N from Fb, so will contribute more to Va of Fa than Vb of Fb.

The proportion that the force F is closer to each force bucket is used to update Ca, Cb, Va, and Vb accordingly. In the example shown, Ca is incremented by 0.8 to a value of 5.0, based on the amount inversely proportional to the distance from Fa. Va is updated based on the current Va value as a proportion of the change in Ca in addition to the fluid flow V of the simulation as a proportion of the contribution of the fluid flow V to the force bucket Fa. The update to Va, in this example, can be given as:

$$Va = 18 * \frac{4.2}{5} + 20 * \frac{0.8}{5},$$

which means Va is updated from 18 to 18.32.

The update to the values of bucket Fb follows the same methodology, such that Cb is incremented by 0.2 to a value of 4.0, and Vb is updated in this example by $$Vb = 24 * \frac{3.8}{4.0} + 20 * \frac{0.2}{4.0},$$

which means Vb is updated from 24 to 23.8.

Figure 3:
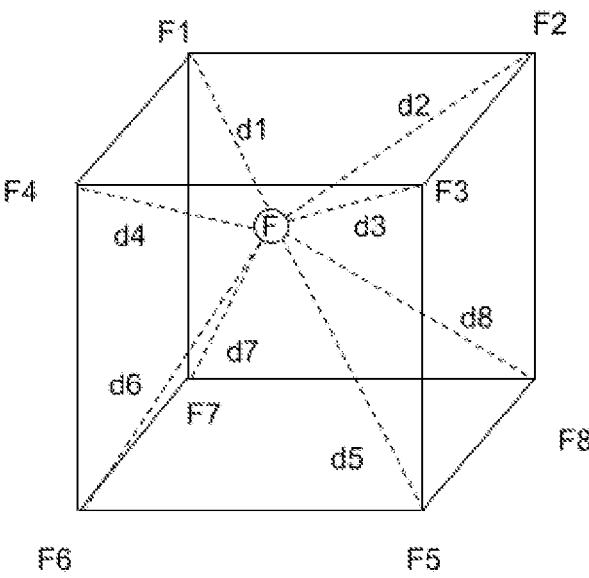
FIG. 3 shows a three-dimensional force bucket calculation according to one or more embodiments of the present invention.

A one-dimensional example was shown in FIG. 2, however, as will be appreciated, the vehicle is a three-dimensional vehicle in a three-dimensional space and the fluid flow will affect the vehicle in the three-dimensional space. Therefore, each force bucket will be a point in the three-dimensional space and be represented accordingly in the look-up table. Thus, a force determined by the simulation for a simulated fluid flow may be relevant proportionally to up to eight different force buckets in the three-dimensional space. This is shown in FIG. 3, which shows the allocation of a force determined by the dynamic model for a simulated fluid flow in a three-dimensional space. In FIG. 3, the simulated force F falls within the force buckets F1 through F8, and therefore a proportion of the simulated fluid flow should be applied to the average fluid flow value of each of the eight force buckets (F1 to F8) based on the proximate distance of the simulated force F from each of the eight force buckets. Similarly, the floating-point count value for each of the eight force buckets (F1 to F8) should be updated accordingly based on the proximate distance of the force F from each force bucket. In terms of the update to the floating-point count value, the total count increment across all eight force buckets may equal one, or any other suitable conditions may be used.

Thus, the force bucket allocation for each force determined in the simulation for a simulated fluid flow is effectively blended into the eight surrounding, or proximate, force buckets by an amount inversely proportional to the distance of the determined force from each force bucket, in an extended, but similar manner, to that of the one dimensional example given above. The simulated force and flow may be blended into the proximate force buckets based on the following equations:

$$D = \sum d_i$$

$$C_i^1 = C_i^0 + \frac{D - d_i}{7D}$$

$$V_i^1 = \frac{V_i^0 C_i^0}{C_i^1} + \frac{V(C_i^1 - C_i^0)}{C_i^1}$$

where:
D is the total distance to the surrounding force buckets;
$d_i$ is the distance to the ith force bucket;

$$C_i^0$$

is the floating point count value associated with the ith bucket prior to updating;

$$c_i^1$$

is the floating point count value associated with the ith bucket after updating;

$$V_i^0$$

is the average fluid flow value associated with the ith bucket prior to updating; and $$V_i^1$$

the average fluid flow value associated with the ith bucket after updating.

For the Force-Flow look-up table to accurately represent the underlying mapping from force to flow, tens of thousands, if not hundreds of thousands, of simulations are executed on the dynamic model to provide a large number of simulated force and corresponding fluid flows which can be allocated to the force buckets so as to provide a substantially accurate representation of the average fluid flow each force maps to.

If the vehicle has symmetry around the xz and xy plane (vehicle frame), a fluid flow with the same magnitude but opposite angle of attack (e.g. +30 or −30 in alpha or beta) will induce the same aerodynamic force but with the relevant components sign flipped. This is summarised below.

$$(V_x, V_y, V_z) \rightarrow (F_x, F_y, F_z)$$

Symmetry around the $xz$ plane: $(V_x, -V_y, V_z) \rightarrow (F_x, -F_y, F_z)$

Symmetry around the $xy$ plane: $(V_x, V_y, -V_z) \rightarrow (F_x, F_y, -F_z)$

If the vehicle has symmetry then this can be advantageously utilised in order to effectively half the size of the force-flow look-up table by only indexing over forces with a positive angle of attack and using the symmetry effect to convert measured forces during operation to that range, and then flip the final result.

It is desirable that the Force-Flow look-up table is able to interpolate between force buckets and have a small memory footprint so that it can be utilised in both small scale vehicles, e.g. nano or micro vehicles, as well as large scale vehicles.

To maximise the usefulness of the Force-Flow look-up table, a variable resolution may be used. The resolution relates to the force buckets in the Force-Flow lookup table, wherein a variable resolution means different resolutions can be applied to different force buckets, or groups of force buckets. This resolution will be given as an independent resolution for each look-up table axis. The specific resolution may be a positive continuous function with increased resolution at areas of interest.

Here the resolution R means how many entries in the Force-Flow look-up table occur per unit in world coordinates, wherein per unit in world coordinates means force buckets per N, for example, a resolution of 10 in one axis would refer to each force bucket being separated or spaced apart by 0.1N.

The Force-Flow lookup table may be indexed by integer coordinates, which may not correspond directly to the real world coordinates (e.g. the vehicle frame force components). It may be desirable to index the Force-Flow look-up table with integer coordinates to enable more efficient lookups when using the look-up table, e.g. faster and simpler. For example, in 1d with a resolution of 10 entries per N, then the tenth entry in the Force-Flow look-up table would correspond to a flow in a force bucket of substantially 1N and an integer coordinate of 10. The integer coordinate arrangement of the Force-Flow look-up table can be expanded to the 3-dimensional representation of the Force-Flow look-up table, with variable resolution. A coordinate transform may be given by the resolution functions R as:

g: Real world coordinates→force-flow look-up table coordinates $$g(x, y, z) = \left( \int_{x_0}^{x} R_x(t)dt, \int_{y_0}^{y} R_y(t)dt, \int_{z_0}^{z} R_z(t)dt \right)$$

Since R is positive, and continuous for each variable, this produces a continuous, increasing bijection. To be useful as a coordinate transform, the resolution functions must have easily computable integrals, and the inverse of their integrals should also be easily computable for the inverse coordinate transform.

This coordinate transform enables the force-flow lookup table to be stored as an array (one-dimensional) in memory with the force-flow lookup table coordinates stored sequentially. This means that a query in the Force-Flow lookup table can follow the following structure:

1. Input force to be queried;
2. Compute to give the equivalent point in lookup table coordinates; and
3. Compute the eight surrounding integer coordinates in the Force-Flow lookup table space.
4. Obtain each of the eight integer coordinate data points in the array containing the Force-Flow lookup table, by converting each integer triple to an array index.
5. Perform a trilinear interpolation for each flow component in the data points and return the final fluid flow estimate vector, this may involve computing real world distances between one or more of the eight points, for which $g^{-1}$ is used.

Any queries of values outside the range of the lookup table may return the closest value in the Force-Flow lookup table, in the case that there is no extrapolation attempt.

The array containing the Force-Flow lookup table may be serialised by writing the contents to a binary file. The coordinate transform g may contain all the variability in the Force-Flow lookup table design, and given the correct functions, g, $g^{-1}$, any binary file can be read into memory and used. This information may be stored in a toml file which configures the function g by specifying the resolution function R.

The one to many issue of $f^{-1}$ is worse at some entries of the Force-Flow look-up table, and may depend upon the vehicle. In areas of the Force-Flow look-up table where the map is more one to many than one to one, it is desirable to have a higher resolution as then the average fluid flow mapped to by that entry is generally a better estimate of the current actual fluid flow. On the other hand, at areas of the table where the underlying map is fairly linear, e.g. more one to one, it is desirable to have quite a low resolution to save space without significant accuracy loss.

The above described system and method for generating and populating a Force-Flow look-up table, i.e. training the mapping function, does not take into consideration any variation in any state of an actuator (e.g. control surface, propulsion system, and so on). Any variation in control surface state may result in the map from fluid flows to forces, and vice versa, changing and therefore it is beneficial to consider variations in control surface state. One option is to include a further dimension to the force-flow look-up table to represent the state of each control surface. However, the additional dimension in the Force-Flow look-up table may significantly increase the required memory footprint of the mapping function, which certain vehicles, e.g. nano or micro drones, may not have the required resources available, but may be desirable in larger sale vehicles where the available memory and resources is less of a constraint.

Thus, a second option is to determine a force correction term, herein defined as a force delta, when the control surface state deviates from their zero or base position state. Given a fluid flow and a control surface state, the induced forces from the given fluid flow with and without the change in control surface state can be determined, for example, from one or more simulations. The force delta may then be determined as the difference between the induced forces from the given fluid flow with and without the change in control surface state. The force delta may be determined by the Control Surface State component 104 of the vehicle.

In the example of the drone defined hereinabove, the control surface may be an actuator, such as an elevon, and the control surface state may be the actuator movement from its zero, non-actuated, position. Therefore, in this example, the force delta may be determined by the Control Surface State component 104 as the difference between the induced forces, for a given air flow, determined with and without actuator movement, so that the force delta can be used to correct for the effects of the actuator movements.

The force deltas determined during the simulations performed by the Dynamic Model 105 may be stored in or generated by a further mapping function, such as a Force Delta look-up table, that may be trained using the one or more simulated datasets, within the Control Surface State component 104, wherein the Force Delta look-up table may be five-dimensional which is indexed by three flow components and two control surface states (e.g. two actuator positions). The Force Deltas may be determined by simulating the fluid flow with and without the actuator input, where the actuators inputs may be from the control state component and/or the propulsion state component, and determine the difference therebetween. Therefore, the Force Delta look-up table will be of a significantly lower resolution than the Force-Flow lookup table, meaning fewer resources are required on the vehicle. In the above example, the Force Delta look-up table is five-dimensional, however, as will be appreciated the number of dimensions may be increased to include any number of control surfaces and/or control surface states, including control over any vehicle propulsion system.

During operation of the vehicle, a current acceleration is measured by the inertial sensors and a force on the vehicle may be determined based on the measured acceleration, and the Control Surface State component 104 may determine the force delta based on an initial fluid flow estimate vector, which may be a preceding fluid flow estimate vector, and data relating to the current control surface state (e.g. actuator position) with reference to the Force Delta look-up table. The determined force delta may then be added to the current measured force to generate a force that corresponds to the same fluid flow (when going through the table with no actuation) as the actual fluid flow that produced the force.

Figure 4:
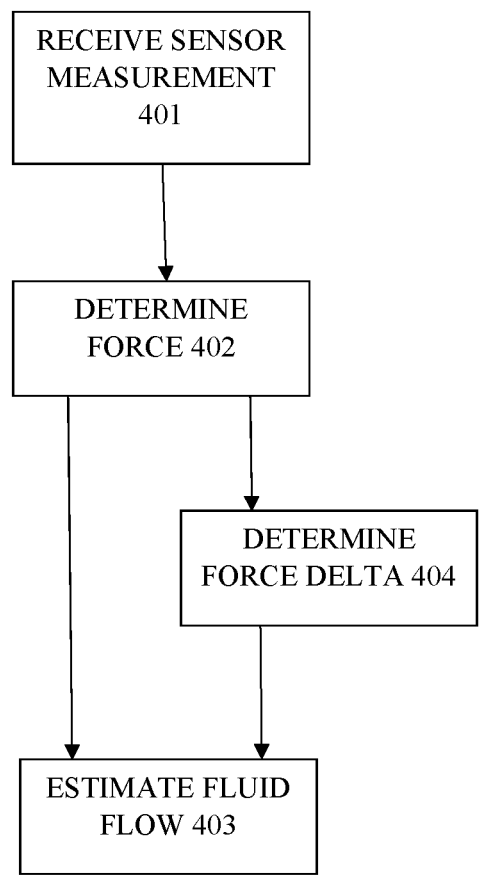
FIG. 4 is a flow chart of a method according to one or more embodiments of the present invention.

During operation of the vehicle, it can utilise the trained mapping function, e.g. the Force-Flow look-up table, to estimate a fluid flow based on the measured forces acting on the vehicle. The vehicle may also take into account the further trained mapping function, e.g. the Force Delta look-up table, in order to improve the accuracy of the fluid flow estimation. The estimation of the fluid flow based on a measured force will now be described with reference to FIG. 4.

The measurement component may receive one or more inertial sensor measurements from one or more inertial sensors located in, or on, the vehicle body 401. In relation to an aerial vehicle, e.g. a drone, the aerial vehicle may include one or more accelerometers as the inertial sensors. The accelerometer measurements will be provided, or transmitted, to the fluid flow estimation component. The accelerometer measurements may be provided directly from the accelerometers or may be provided indirectly from the vehicle navigation system which may determine the acceleration of the vehicle. Any suitable sampling frequency of the accelerometers may be implemented, for example, 200 Hz with one accelerometer measurement per iteration.

The flow estimation component receives the accelerometer measurements and determines a force on the vehicle frame 402 based on equation (12).

$$F = ma. \hspace{3cm} \text{Equation (12)}$$

where F is the force, m is the mass of the vehicle, and a is the measured acceleration.

As the mass m of the vehicle is known and the acceleration a is measured by the inertial sensors, e.g. accelerometers, on, or in, the vehicle then the force F can be calculated from equation (12).

Prior to determining the force F, the acceleration measurements may be subjected to pre-processing in order to remove, or substantially remove, the effects of gravity. If the acceleration measurements are obtained indirectly via a navigation system of the vehicle then the effects of gravity may need to be removed, for example, the effects of gravity may be removed from the vertical acceleration component of the acceleration measurements by converting to the Earth frame, e.g. the NED frame, and back with an attitude estimate. However, if the acceleration measurements are obtained directly from the accelerometer measurements then the effects of gravity would not need to be compensated for. In both cases, the effects of other external forces, such as thrust, should be removed from the acceleration measurements, for example, the other external forces can be subtracted (i.e. removed) from the acceleration measurements. If the external force is a thrust force then as the force produced by a thruster can be affected by the state of other actuators the thruster may be considered as a further actuator and the effect of the thruster may be subtracted by including it as a further dimension in the force-delta look-up table.

The determined force F may then be used by the Fluid Flow estimation component to determine, or estimate, the fluid flow conditions on, or around, the vehicle body, e.g. aerial drone 403. This may be achieved by referencing the Fluid-Flow look-up table and interpolating to the respective fluid flow estimation value for the Force F. In other words, the fluid flow estimation may be determined based on the Force-Flow look-up table and the determined force.

As mentioned hereinabove, the accuracy of the fluid flow estimation may be improved by optionally taking into consideration the effects on the measured force of the one or more actuator states by determining a Force Delta 404. Based on an initial fluid flow estimate vector, for example a preceding fluid flow estimate vector, and one or more actuator states, the corresponding Force Delta can be identified using interpolation in the Force Delta look-up table. The Control Surface State component may then provide the determined Force Delta to the Fluid Flow estimation component, which can combine the received Force Delta to the determined force F to generate a modified force $F_m$. The modified force $F_m$ can then be utilised to identify the fluid flow estimate vector by interpolating to the respective fluid flow estimation vector for the force $F_m$. In other words, the fluid flow estimation may be determined based on the Force-Flow look-up table and the determined modified force $F_m$.

Accordingly, a fluid flow estimate vector can be determined for a vehicle in operation based on measuring one or more forces affecting the vehicle. This is advantageous as it enables a fluid flow estimate vector to be determined without the need for conventional pressure based flow sensors, which are typically large, heavy, and have drawbacks, such as reliability, sensitivity, low sampling rates, and so on.

Furthermore, the determined fluid flow estimate vector can be used as an enabler for various advantageous determinations, functions, and control operations, for example:

determining a wind/current estimate;

control of the vehicle can be enhanced, for example, guidance systems where the fluid flow estimate vector is provided by the embodiments of the present invention improves the accuracy, sensitivity, physical constraints and levels of reliability not achievable with current fluid flow measurement systems;

ability for in-operation diagnostics, for example, using the fluid flow vector to detect developing issues such as stalls or vehicle frame failures;

fluid flow based navigation that used local fluid flow data to augment the accuracy of inertial navigation systems; and wind measurement vehicle, e.g. drone, that can provide unsteady, spatially dispersed, 3D flow conditions in environments that traditional ground based techniques are unable to provide.

One example of the advantageous extensions of the embodiments of the present invention is the ability to determine an accurate wind estimation for an aerial vehicle and an accurate current estimation for an underwater vehicle. In the following, a determination of the wind estimate for an aerial drone using the determined fluid flow (i.e. airflow) estimate.

A wind estimation component may be included within the vehicle to determine a wind estimate based on the following equation:

$$wind = airflow + velocity - \text{Equation (13)}.$$

The velocity of the aerial drone can be determined from the aerial drone's navigation system, as this can provide an accurate estimate of the vehicle's current groundspeed (i.e. velocity of the aerial drone relative to the ground). The wind estimation component may use an attitude estimate from the navigation system of the aerial drone to rotate the fluid flow estimate to the Earth frame in order to derive a current Earth frame estimate. This is because ground speed is given in relation to the Earth frame, whilst fluid velocity is given in relation to the vehicle body frame. Therefore, in order to compare the ground speed and the fluid velocity it is preferable to use a consistent frame of reference. The attitude of the vehicle is equivalent to a change of reference, which is essentially the rotation of the aerial drone with respect to the fixed earth frame, in other words, the rotation enables the conversion of the Earth frame to the body frame.

The current Earth frame velocity estimate may then be added to the Earth frame fluid flow estimate vector determined as described previously in order to determine an Earth frame wind estimate. The Earth frame is the relevant frame in relation to the wind estimate. The rotation may be performed by a mathematical operation on a vector, for example, the rotation can be understood as a rotation matrix and the operation is matrix multiplication.

Thus, a wind estimate can be advantageously determined using the fluid flow estimate vector.

In the embodiments where a wind estimate is determined, the wind estimate may be utilised to determine the initial fluid flow estimate vector for the determination of the force delta. The initial fluid flow estimate vector was previously set at a preceding fluid flow estimate vector in the determination of the force delta. However, where a wind estimation is determined then the initial fluid flow estimate vector may alternatively, or additionally, be determined by subtracting the vehicle-frame velocity estimate from the vehicle-frame wind estimate, where, based on the attitude estimate of the aerial drone, the previous wind estimate may be rotated to the vehicle frame to determine the vehicle-frame wind estimate.

Another example of the advantageous extensions of one or more the embodiments of the present invention includes a flow measurement vehicle, such as a wind measurement vehicle. The data relating to wind measurements is typically unsteady 3D data and therefore if the vehicle is moving through the environment repeatedly in specific spatial patterns it can be used to generate a complete, live, spatial wind map.

A further example of the advantageous extensions of one or more the embodiments of the present invention includes in operation diagnostics which can be utilised to explore deviations to the flow estimation technique that cannot be accounted for by the fluid flow. These deviations may indicate dynamic differences to the baseline systems of the vehicle thereby enabling the ability to pinpoint if any deviations have occurred due to a specific issue, for example, if a control surface became stuck in a fixed position, or sections of the fuselage are damaged/lost.

Another example of the advantageous extensions of one or more the embodiments of the present invention includes an improvement in control authority which derives from an accurate estimate of fluid flow as the efficacy of control response is a function of fluid speed. Therefore, accurate fluid flow estimate vectors allow the control system to respond more appropriately at any instant in time.

A further example of the advantageous extensions of one or more embodiments of the present invention includes flow-based navigation. Flow-based navigation is an improvement on the accuracy of pure inertial navigation by using information about the fluid flow affecting the vehicle. Unlike pure inertial navigation which estimates position from acceleration, flow navigation also utilises a direct estimation of ground velocity, which may be used to estimate position. This direct velocity estimate causes a significantly lower rate of growth in the position estimate error.

The fluid flow can be estimated as described herein above based on accelerometer data coupled with an aerodynamic model of the vehicle, or by other means. The flow-based navigation system relies upon an a priori estimate of the prevailing wind, and is designed to operate over short time-scales, for example, in the order of five minutes, in which the prevailing wind estimate is not likely to change significantly. With intermittent updates to the prevailing wind estimate the system can operate for significantly longer. These updates could be provided directly for example via weather forecasts, or estimated based on sensor data, an example of which is described below.

Given a prevailing wind estimate and a determination of the fluid flow estimate vector affecting the vehicle it is possible to estimate ground velocity with the following: V=W−F, where V is ground velocity, W is the prevailing wind velocity, which may be derived from the wind estimate, and F is the fluid flow velocity past the vehicle derived from the fluid flow estimate vector.

Integration of the estimated ground velocity may provide the vehicle position estimate, wherein the navigation system of the vehicle may perform the integration of the ground velocity estimate using a suitable method such as a Kalman filter.

In systems requiring longer navigation endurance it may be used in conjunction with a localisation system such as GPS or vision-based localisation which provides occasional position fixes to correct the gradually accumulating error. In a system that is able to provide ground velocity fixes, e.g GPS, the prevailing wind estimate can be updated using the wind estimation method described hereinabove. This allows a system with intermittent GPS readings, or any other ground velocity measurement, to navigate effectively with flow based navigation in between GPS readings, with an accurate prevailing wind estimate seeded from the available ground velocity measurement.

In the foregoing embodiments, features described in relation to one embodiment may be combined, in any manner, with features of a different embodiment in order to provide a more efficient and effective fluid flow estimation. Note that, the above description is for illustration only and other embodiments and variations may be envisaged without departing from the scope of the invention as defined by the appended claims.

The invention claimed is:

1. A method comprising:

receiving one or more sensor measurements from one or more inertial sensors, wherein the sensor measurements are indicative of at least one acceleration of a vehicle;

determining a 3-dimensional force on the vehicle based on the received sensor measurements indicative of at least one acceleration;

determining a force delta, wherein the force delta is a difference between a 3-dimensional force with a change in a control surface state and a 3-dimensional force without the change in the control surface state, wherein determining the force delta comprises:

identifying an initial 3-dimensional fluid flow estimate vector;

receiving data relating to a current control surface state; and referencing a Force Delta look-up table based on the initial 3-dimensional fluid flow estimate vector and the data relating to the current control surface state;

adding the force delta to the determined 3-dimensional force; and determining a 3-dimensional fluid flow estimate vector corresponding to the determined 3-dimensional force based on an inverted Fluid Flow to Force mapping function, wherein the mapping function is trained based on one or more training datasets and the 3-dimensional fluid flow estimate vector is indicative of a fluid flow affecting at least the lift and drag forces acting on the vehicle.

2. The method of claim 1, in which the inverted Fluid Flow to Force mapping function is represented by a Force-Flow look-up table and determining the fluid flow estimate vector further comprises:

referencing the Force-Flow look-up table based on the determined force to determine the corresponding 3-dimensional fluid flow estimate vector.

3. The method of claim 2, in which determining the fluid flow further comprises:

interpolating the determined 3-dimensional force to a corresponding 3-dimensional fluid flow estimate vector.

4. The method of claim 1, further comprising:

performing a plurality of simulations on a dynamic model of the vehicle, wherein the simulations determine a 3-dimensional force with a change in a control surface state and a 3-dimensional force without the change in the control surface state, for a given fluid flow;

determining a difference between the 3-dimensional force with the change in a control surface state and the 3-dimensional force without the change in the control surface state; and populating the Force-Delta look-up table with the determined difference.

5. The method of claim 1, further comprising:

modifying the sensor measurements to remove an effect of at least one external force.

6. The method of claim 2, further comprising:

performing a plurality of simulations on a dynamic model of the vehicle, wherein the simulations determine a 3-dimensional force for a given fluid flow; and populating the Force-Flow look-up table with the determined simulated 3-dimensional force.

7. The method of claim 2, further comprising:

receiving telemetry data from a plurality of vehicle operations and/or wind tunnel experiments; and populating the Force-Flow look-up table based on the received telemetry data.

8. The method of claim 6, in which the Force-Flow look-up table comprises a plurality of 3-dimensional force buckets, wherein populating the Force-Flow look-up table with the determined simulated force further comprises:

assigning each determined simulated force to one or more proximate 3-dimensional force buckets proportional to a distance between the determined simulated force and the one or more proximate force buckets.

9. The method of claim 8, in which each 3-dimensional force bucket is indicative of an average, or weighted average, fluid flow corresponding to the forces assigned to each force bucket.

10. The method of claim 8 in which each 3-dimensional force bucket is indicative of a region of fluid flows corresponding to the forces assigned to each bucket.

11. The method of claim 8, further comprising:

applying a variable resolution to each of the 3-dimensional force buckets.

12. The method of claim 1, further comprising:

restricting the fluid flow function to a predefined set of fluid flows.

13. The method of claim 1, further comprising:

receiving a ground velocity estimate of the vehicle; and determining a wind estimate based on the fluid flow estimate vector and the ground velocity estimate.

14. The method of claim 1, further comprising:

determining a ground velocity estimate based on an estimate of the prevailing wind and the 3-dimensional fluid flow estimate vector.

15. The method of claim 14 further comprising:

determining a vehicle position estimate based on an integration of the determined ground velocity estimate; and performing flow based navigation based on the determined vehicle position estimate.

16. A computer program product comprising computer readable executable code for implementing a method configure to:

receive one or more sensor measurements from one or more inertial sensors, wherein the sensor measurements are indicative of at least one acceleration of a vehicle;

determine a 3-dimensional force on the vehicle based on the received sensor measurements indicative of at least one acceleration;

determine a force delta, wherein the force delta is a difference between a 3-dimensional force with a change in a control surface state and a 3-dimensional force without the change in the control surface state, wherein determining the force delta comprises:

identifying an initial 3-dimensional fluid flow estimate vector;

receiving data relating to a current control surface state; and referencing a Force Delta look-up table based on the initial 3-dimensional fluid flow estimate vector and the data relating to the current control surface state;

add the force delta to the determined 3-dimensional force; and determine a 3-dimensional fluid flow estimate vector corresponding to the determined 3-dimensional force based on an inverted Fluid Flow to Force mapping function, wherein the mapping function is trained based on one or more training datasets and the 3-dimensional fluid flow estimate vector is indicative of a fluid flow affecting at least the lift and drag forces acting on the vehicle.

17. A system comprising:

a computing device; and a vehicle;

wherein the system is configured to implement a method comprising:

receiving one or more sensor measurements from one or more inertial sensors, wherein the sensor measurements are indicative of at least one acceleration of a vehicle;

determining a 3-dimensional force on the vehicle based on the received sensor measurements indicative of at least one acceleration;

determining a force delta, wherein the force delta is a difference between a 3-dimensional force with a change in a control surface state and a 3-dimensional force without the change in the control surface state, wherein determining the force delta comprises:

identifying an initial 3-dimensional fluid flow estimate vector;

receiving data relating to a current control surface state; and referencing a Force Delta look-up table based on the initial 3-dimensional fluid flow estimate vector and the data relating to the current control surface state;

adding the force delta to the determined 3-dimensional force; and determining a 3-dimensional fluid flow estimate vector corresponding to the determined 3-dimensional force based on an inverted Fluid Flow to Force mapping function, wherein the mapping function is trained based on one or more training datasets and the 3-dimensional fluid flow estimate vector is indicative of a fluid flow affecting at least the lift and drag forces acting on the vehicle.

* * * * *